United States Patent [19]
Watanabe et al.

[11] Patent Number: 4,847,637
[45] Date of Patent: Jul. 11, 1989

[54] INK JET RECORDING APPARATUS HAVING A CAP FOR MAINTAINING A CLEAN DISCHARGE PORT

[75] Inventors: Kenjiro Watanabe, Tokyo; Junji Shimoda, Chigasaki, both of Japan

[73] Assignee: Canon Kabushiki Kaisha, Tokyo, Japan

[21] Appl. No.: 136,775

[22] Filed: Dec. 22, 1987

[30] Foreign Application Priority Data

Dec. 25, 1986 [JP] Japan ............................ 61-307933

[51] Int. Cl.[4] ............................ G01D 15/18
[52] U.S. Cl. ............................ 346/140 R; 346/1.1
[58] Field of Search ............................ 346/140, 75, 1.1

[56] References Cited

U.S. PATENT DOCUMENTS

| | | | |
|---|---|---|---|
| 4,383,263 | 5/1983 | Ozawa | 346/140 |
| 4,394,669 | 7/1983 | Ozawa et al. | 346/140 R |
| 4,551,735 | 11/1985 | Suzuki et al. | 346/140 R |
| 4,586,058 | 4/1986 | Yamazaki et al. | 346/140 R |
| 4,628,333 | 12/1986 | Terasawa | 346/140 |
| 4,631,554 | 12/1986 | Terasawa | 346/140 R |
| 4,631,556 | 12/1986 | Watanabe et al. | 346/140 R |

FOREIGN PATENT DOCUMENTS

| | | |
|---|---|---|
| 3128366A1 | 7/1982 | Fed. Rep. of Germany . |
| 3420050A1 | 12/1984 | Fed. Rep. of Germany . |
| 56-113464 | 7/1981 | Japan . |
| 59-232872 | 12/1984 | Japan . |
| 60-171162 | 9/1985 | Japan . |
| 2184066A | 6/1987 | United Kingdom . |

*Primary Examiner*—Joseph W. Hartary
*Attorney, Agent, or Firm*—Fitzpatrick, Cella, Harper & Scinto

[57] ABSTRACT

An ink jet recording apparatus comprises a discharge port for discharging the ink, a storing portion for storing the ink therein, a cap for covering said discharging port, pump means communicated with said cap, a sucking tube for communicating said cap with said storing portion and a valve provided in said sucking tube.

21 Claims, 7 Drawing Sheets

INK JET RECORDING APPARATUS HAVING A CAP FOR MAINTAINING A CLEAN DISCHARGE PORT

BACKGROUND OF THE INVENTION

1. Field of the Invention

This invention relates to an ink jet recording apparatus.

2. Related Background Art

An apparatus of this type has a discharge port of a minute diameter usually of the order of $\phi$30-100 $\mu$m for discharging recording liquid droplets.

Accordingly, if the apparatus of this type is left unused under room temperature or high temperatures for a long period of time, the water content in the recording liquid (ink) is vaporized and the viscosity of the ink near the discharge port is readily increased or the adherence of the ink occurs and thus, formation of recording liquid droplets becomes impossible in some cases.

So, some of apparatuses according to the prior art are provided with a cap for capping the discharge port during the non-operation of the apparatuses to thereby prevent the vaporization of ink from the discharge port, or are provided with a mechanism for forcibly sucking ink from the discharge port during the non-discharge of recording liquid droplets.

However, even in the conventional apparatuses provided as stated above, if the apparatuses are left unused under a high temperature environment for a long period of time or if use is made of special ink having high fixativenees and a low blotting rate, it has sometimes been the case that an increase in the viscosity of the ink in the discharge port portion or the adherence of the ink to the discharge port portion cannot be sufficiently coped with.

SUMMARY OF THE INVENTION

An object of the invention is to provide an ink jet recording apparatus comprising a discharge port for discharging the ink, a storing portion for storing the ink therein, a cap for covering said discharging port, pump means communicated with said cap, a sucking tube for communicating said cap with said storing portion and a valve provided in said sucking tube.

Another object of the invention is to provide an ink jet recording apparatus comprising an ink jet recording head having a discharge port for discharging the ink, a cap abutting said head to cover said discharge port, abutting means for abutting said head with said cap, storing portion for storing the ink therein supplied to said head, a sucking tube for communicating said cap with said storing portion, pump means for generating sucking force for communicating said cap, a valve provided in said sucking tube; and control means for controlling said abutting means, said pump means and said valve.

A further object of the invention is to provide a method for recovering the suction comprising (a) capping with a cap a discharge port of an ink jet recording head, (b) driving a pump to such in the cap in said capping state, ink and/or gas being sucked from a storing portion for storing the ink which is supplied to said discharge port and/or said head, (c) releasing said capping after said driving is stopped; and (d) closing a valve provided in the connected path between said cap and said storing portion after releasing said capping.

A still further object of the invention is to provide a method for recovering the suction comprising (a) capping with a cap a discharge port of an ink jet recording head, said capping being performed in the condition that a valve communicates said cap with the open air, said valve being provided in a connecting path communicating said cap with a storing portion storing the ink supplied to said head, (b) operating said valve so as to communicate said cap with said storing portion in said capping state, (c) driving a pump so as to suck in said cap after said valve is operated; and (d) releasing said capping after said driving is stopped.

DETAILED DESCRIPTION OF THE PREFERRED EMBODIMENTS

In the present invention, each element is designed such that in the discharge restoring operation, ink is introduced from a storing member into a joining member and the vicinity of a discharge port is washed, whereby even when there is viscosity increase or an adherence of the ink to the discharge port, such ink can be reliably removed.

The present invention will hereinafter be described in detail with reference to the drawings.

Figure 1:
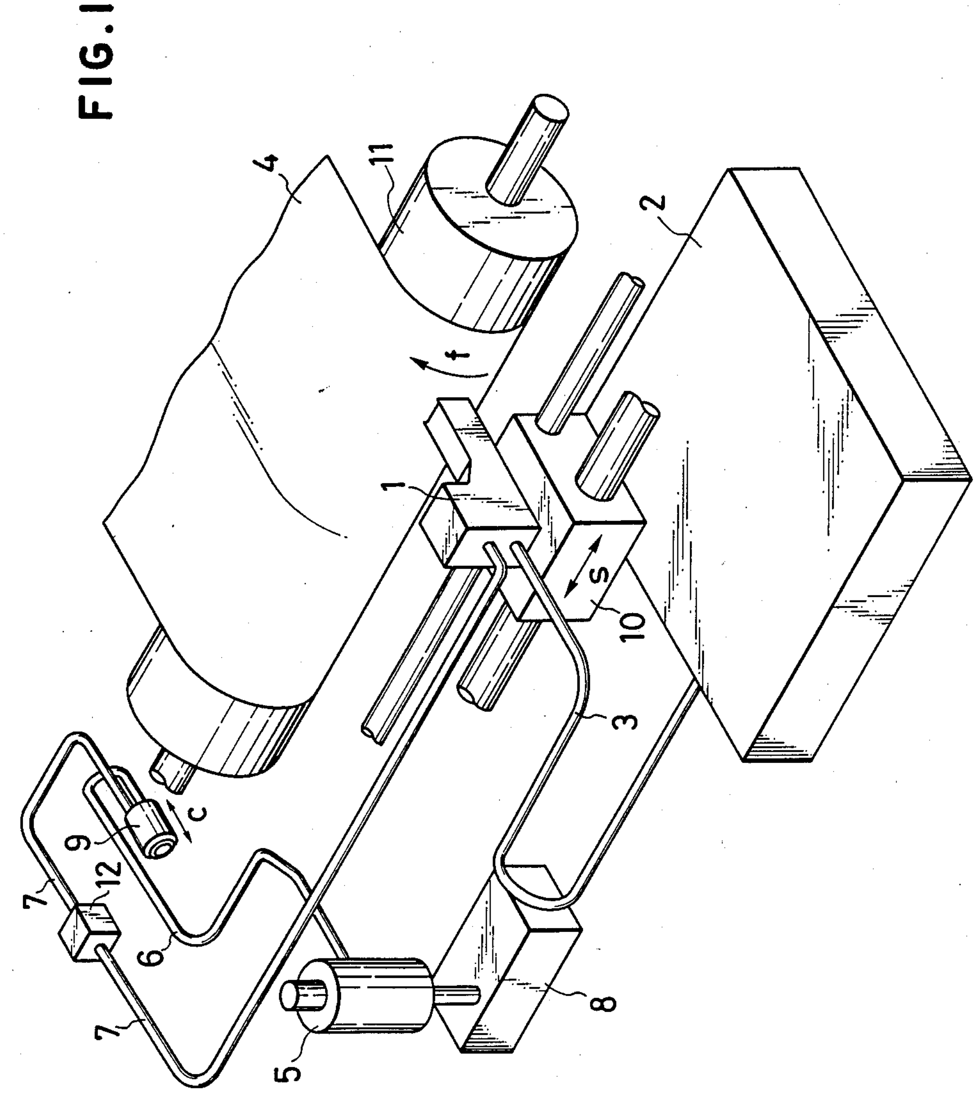
FIGS. 1 and 2 are a schematic perspective view and a schematic cross-sectional view, respectively, showing a first embodiment of the ink jet recording apparatus of the present invention.
Figure 2:
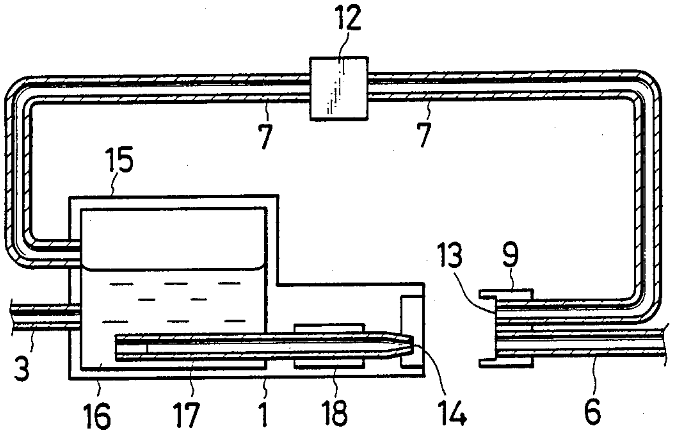

FIGS. 1 and 2 illustrate a first embodiment of the present invention, and in FIG. 1, there is shown a schematic perspective view of an ink jet recording apparatus to which the present invention is applied.

In FIG. 1, the reference numeral 1 designates a head unit having an ink jet recording head according to the present embodiment and a sub-tank for temporarily storing ink therein. Design has been made such that liquid such as ink supplied from a main tank 2 through a supply tube 3 is discharged from the recording head 1 and forms flying liquid droplets to thereby accomplish recording on a recording sheet 4 such as paper.

The reference numeral 5 denotes a discharge restoring pump used when unsatisfactory discharge or non-discharge of liquid droplets occurs. This pump 5 generates a suction force for sucking the liquid from an ink suction port disposed in a cap 9 joinable through a suction tube 6 so as to cover a discharge port provided in the head of the head unit and communicating with the sub-tank and for restoring the discharging operation. The sucked ink is directed into a waste liquid reservoir 8 and stored therein.

The cap 9 has been disposed, for example, at the home position outside the recording area so as to be capable of opposing the head unit 1, and is used to prevent the ink in the head unit 1 from drying or foreign materials such as dust and the like from mixing with the ink when ink jet recording is not effected for a long period of time or when the apparatus is being transported. As viewed in FIG. 1, the cap 9 has been designed so as to move in the direction of arrow C and join with the discharge port located at the fore end of the head unit 1 so as to cover the discharge port.

The reference numeral 10 designates a carriage carrying the head unit 1 thereon and scanned in the direction of arrow S, and the reference numeral 11 denotes a platen for conveying the recording sheet 4 in the direction of arrow f while controlling the recording surface by the head unit 1.

FIG. 2 is a schematic cross-sectional view illustrating the positional relations between various elements in the ink jet recording apparatus shown in FIG. 1 when the head unit including an ink jet recording head is positioned at the home position opposed to the cap 9.

In FIG. 2, the reference numeral 14 designates a discharge port formed at the end of an ink liquid path 17. The ink 16 supplied through the ink liquid path 17 has been discharged from the discharge port 14 as liquid droplets.

The reference numeral 18 denotes a cylindrical piezo-electric element which is one of the possible discharge energy generating members for generating energy used to discharge the liquid. The cylindrical piezo-electric element has been mounted along the ink liquid path 17 so as to surround the ink liquid path 17.

The reference numeral 15 designates a sub-tank which is an example of storing portion for temporarily storing therein the ink supplied by the ink tank 2. With the cap 9 closed, suction is effected by the pump 5 shown in FIG. 1 through a suction tube 7, whereby the liquid surface in the sub-tank 15 is kept at a predetermined position. The suction tube 7 communicates the sub-tank 15 with an ink sucking port 13 disposed in the cap 9, and a valve 12 is provided half-way of the suction tube 7.

Figure 3:
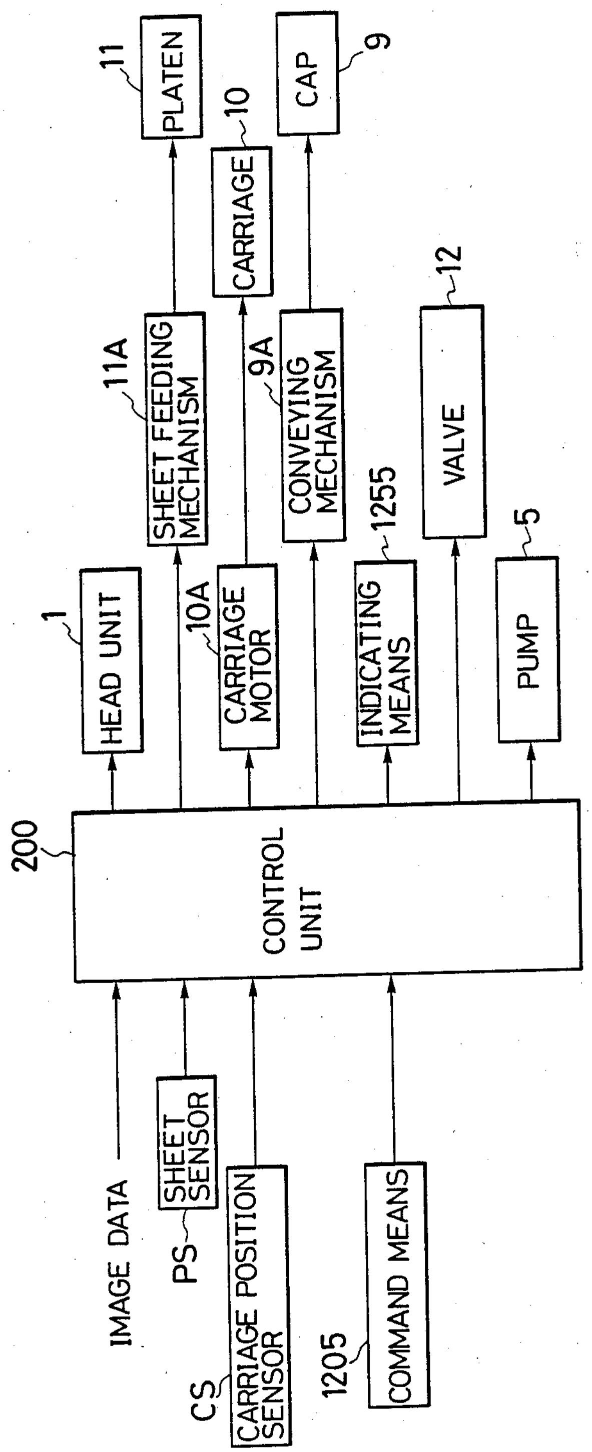
FIG. 3 is a block diagram showing an example of the construction of a control system according to the first embodiment.

FIG. 3 shows an example of the construction of the control system of the apparatus according to the present embodiment. The reference numeral 200 designates a control unit, for example, in the form of a microcomputer having CPU, ROM, RAM, etc. The control unit 200 has been designed to control various parts in accordance with the processing procedure shown in FIG. 4 which is stored in the ROM, and drive the piezo-electric element 18 of the head unit 1 with respect to image data received from a host apparatus or the like to thereby accomplish recording. PS denotes a sheet sensor for detecting a recording sheet P. In response to the detection by the sheet sensor PS, the control unit 200 drives the platen roller 11 through a sheet feeding mechanism 11A including a sheet feeding motor and controlled the sheet feeding. CS designates a carriage position sensor. In conformity with positional information detected by the carriage position sensor CS, the control unit 200 controls the driving of the carriage 10 and the positioning to the home position, etc. through a carriage motor 10A.

Designated by 9A is a conveying mechanism (abutting means) having a transmission mechanism such as gears and a cam and a driving member such as a motor for conveying the cap 9 in the direction of arrow C in FIG. 1. The reference numerals 1205 and 1255 denote command means and indicating means, respectively, provided on an operating panel, not shown.

Figure 4:
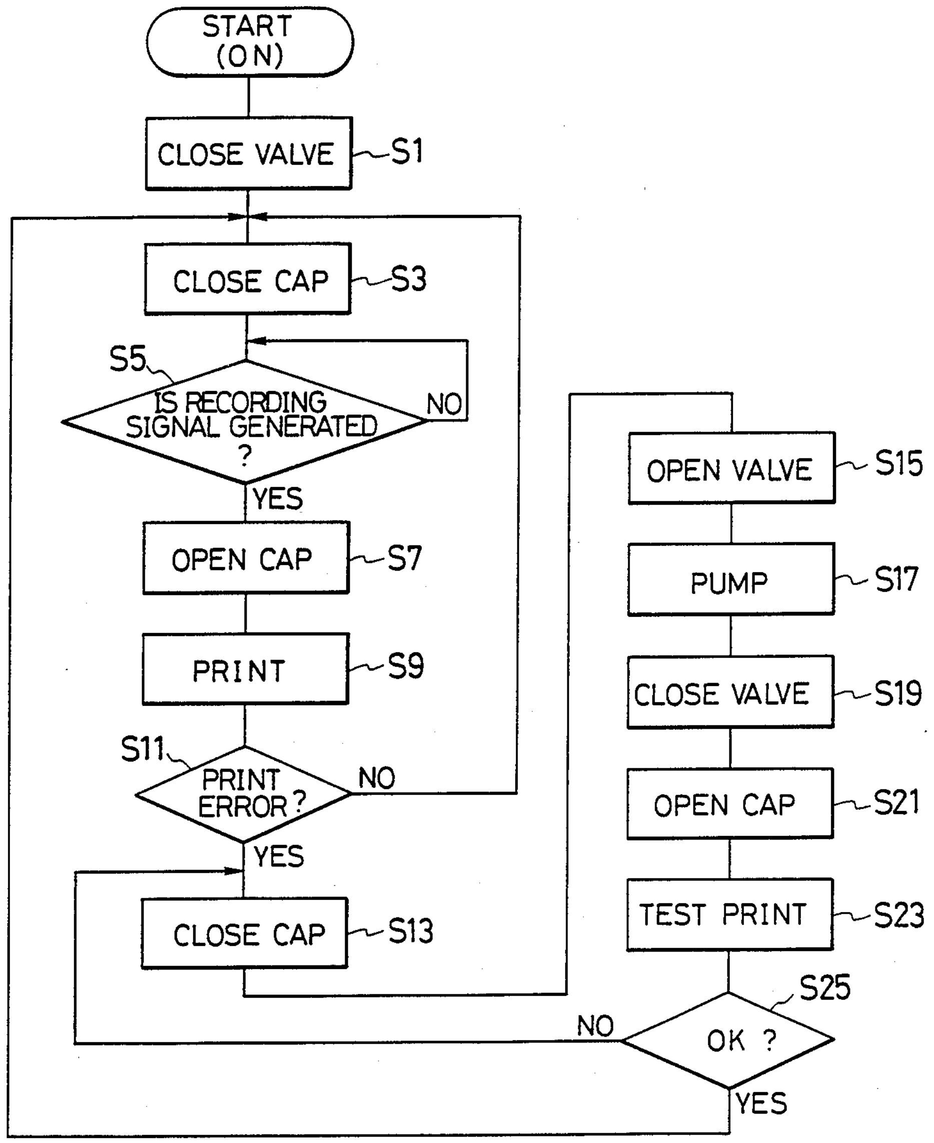
FIG. 4 is a flow chart showing an example of the recording process procedure according to the first embodiment including the discharge restoring operation.

Shown in FIG. 4 is an example of the recording operation procedure according to the present embodiment.

When the main switch is first closed, the present procedure is started, and at step S1, the valve 12 has been closed, and at step S3, the head unit 1 is positioned at the home position and capping is done by moving the cap 9 with the abutting means, and at step S5, the standby state is brought about. That is, in the standby state, capping is done and the discharge port 14 has been hermetically sealed, whereby vaporization of the water content in the ink has been prevented. Thereby, the unsatisfactory discharge due to the increase in viscosity and the adherence of the ink in and near the discharge port can be prevented. At that time, the valve 12 remains left effective even if it has been opened.

When in this standby state, a recording signal such as image data is input from the host apparatus, the cap 9 is opened at step S7, and the recording operation is performed at step S9. During this recording operation, that is, when the cap 9 is open, the liquid level in the sub-tank 15 is prevented from lowering because the valve 12 is closed.

Then, at step S11, the recording condition is judged and if the condition is good, shift is made via step S3 to the standby state of step S5. This judgment of the recording condition can be done by visually made or by an unsatisfactory indication of a record detecting device appropriately disposed. When unsatisfactory recording has occurred, the restoring operation of step S13 and subsequent steps are performed.

At step S13, the head unit 1 is positioned at the home position and capping is done by the cap 9, whereafter at step S15, the valve 12 has been opened. When in this state, at step S17, the pump 5 is driven to effect suction, the ink 16 is sucked from the discharge port 14 and, since the valve 12 is open, the air and ink have been sucked from the ink sucking port 13 and the ink surface in the sub-tank 15 has been kept at a predetermined level. This driving of the pump 5 can be automatically effected by the command from the control unit 200 as shown in FIG. 3, or it can be manually effected.

Even when an increase in viscosity or adherence has occurred to the ink in the discharge port 14 and the discharge restoration could not be accomplished only by the suction force of the pump 5, according to the construction of the present embodiment, the interior of the cap 9 is filled with the ink due to the ink suction from the sucking port 13 and therefore, the viscosity-increased or adhereing ink near the discharge port 14 can be washed away.

After the termination of this pumping, test recording is effected at steps S19–S25. That is, at step S19, the valve 12 is again closed, and at step S21, the valve 12 is opened, and at steps S23 and S25, the recording condition has been judged. When it is judged that the restoration is not sufficient, return is made to step S13, where the restoring operation by the pump 5 is again performed, and when it is judged that the discharge is restored, return is made to step S3, where the head unit 1 is positioned at the home position and the cap 9 is closed to bring about the standby state. The test print of step S19 and subsequent steps may or may not be effected, but is it preferable in that reliable unsatisfactory discharge is confirmed to effect test print.

Figure 5:
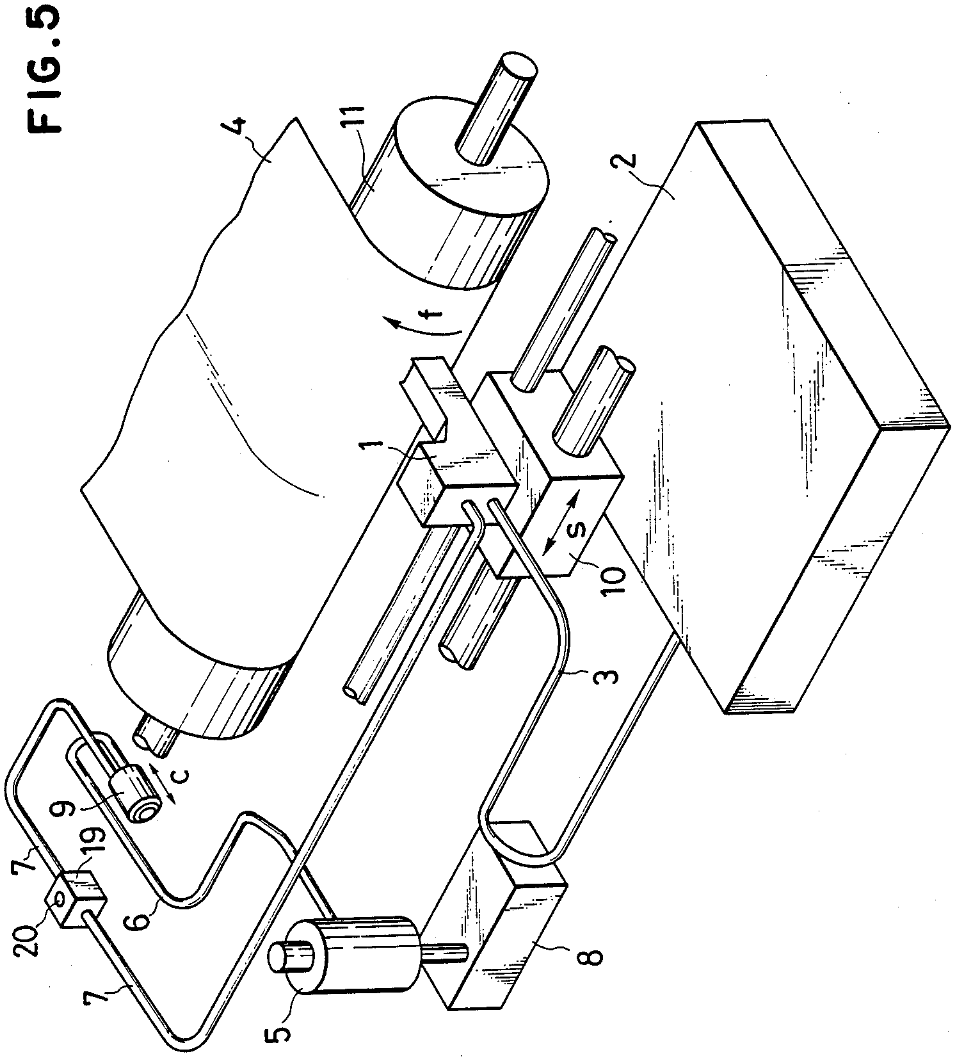
FIGS. 5 and 6 are a schematic perspective view and a schematic cross-sectional view, respectively, of a second embodiment of the present invention.
Figure 6:
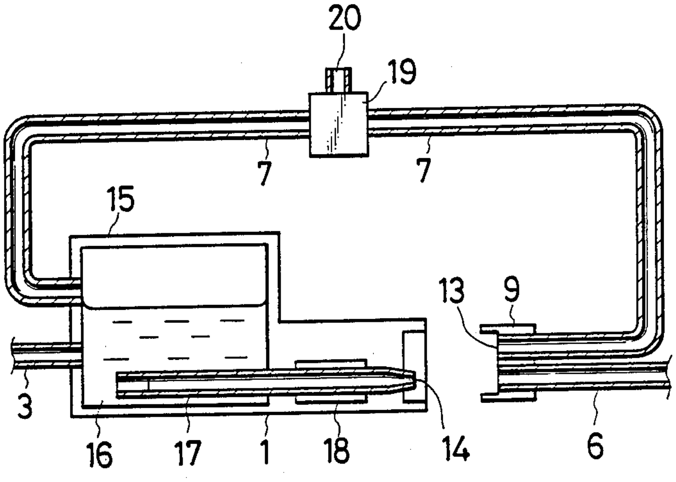

FIGS. 5 and 6 show another embodiment of the present invention. In this embodiment, portions which can be constructed similarly to the portions of the embodiment shown in FIGS. 1 and 2 are given similar reference numerals. In the present embodiment, a three-way valve 19 is disposed instead of the valve 12, half-way of the suction tube 7. Designated by the reference numeral 20 is an open air communicating hole formed in the three-way valve 19. The three-way valve 19 serves to communicate the sucking port 13 with the sub-tank 15 or the open air in a change-over fashion.

Again in the present embodiment, the control system can be constructed substantially similarly to that of FIG. 3.

Figure 7:
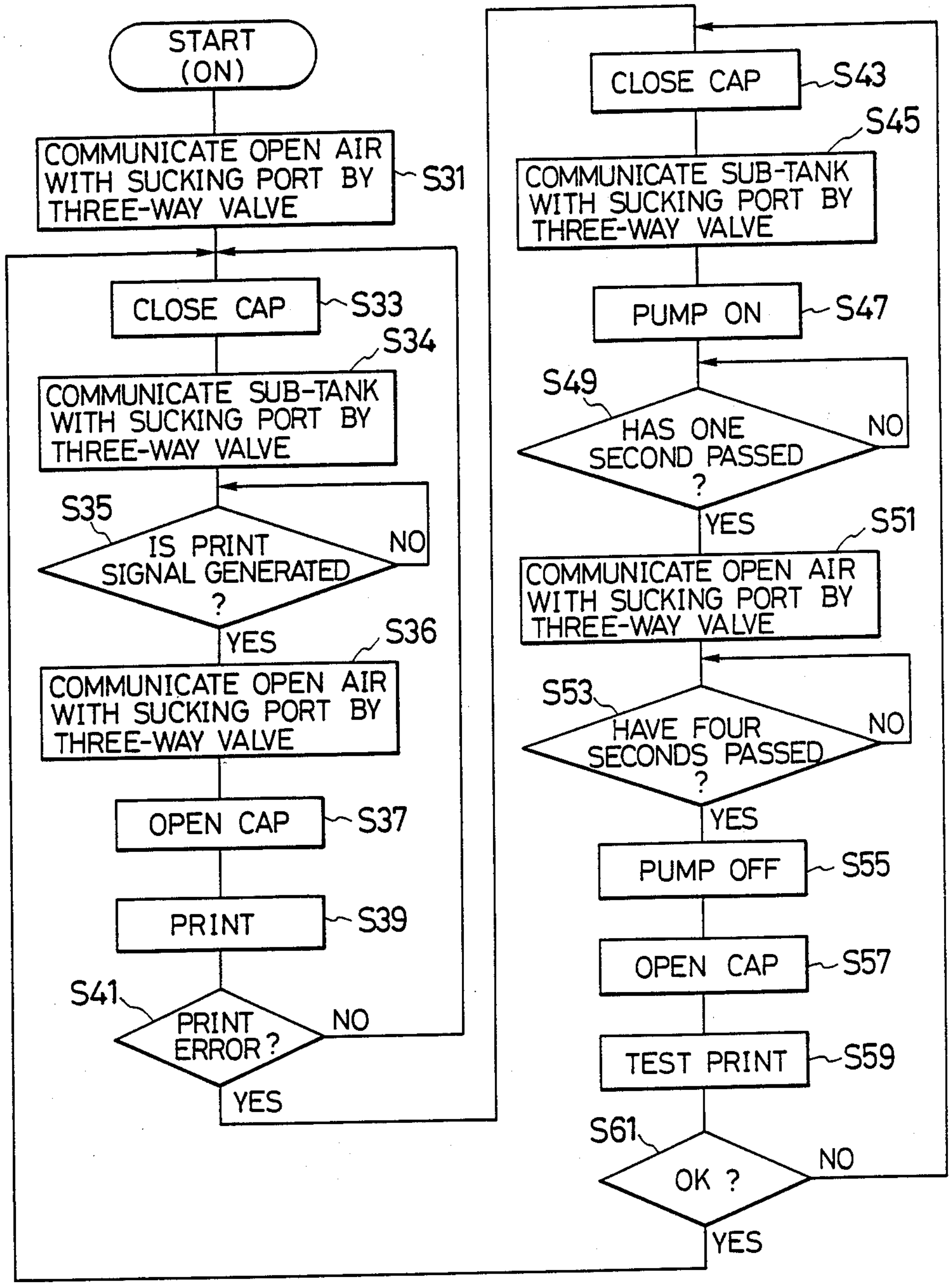
FIG. 7 is a flow chart showing an example of the recording process procedure according to the second embodiment including the discharge restoring operation.

The operation of the present embodiment will hereinafter be described with reference to an example of the flowchart of the processing procedure shown in FIG. 7.

First, immediately after the main switch is closed, at step S31, the open air communicating hole 20 is communicated with the ink sucking port 13 by the three-way valve 19, and at step S33, the cap 9 is closed. Thereby, the temporary rise of the pressure in the cap 9 created at the moment when the cap 9 is closed can be released into the open air and therefore, the retraction of the meniscus into the discharge port 14 during capping, i.e., the introduction of the air into the ink liquid path 17, can be prevented.

After the cap 9 has been closed, the interior of the cap 9 is hermetically sealed and in order to prevent any increase in the viscosity or the adherence of the ink, the three-way valve 19 is changed over at step S34 to communicate the sub-tank 15 with the ink sucking port 13, and then at step S35, the image data standby state is entered.

When the image data is input and is shift is made to recording, the three-way valve 19 is changed over at step S36, and the open air communicating hole 20 is communicated with the ink sucking port 13 and the interior of the sub-tank 15 is hermetically sealed so that the ink liquid level in the sub-tank 15 does not lower even during recording, that is, even when the cap 9 is open. Thus, at step S37, the cap 9 is opened, and at step S39, the recording operation is executed.

When recording is effected and unsatisfactory recording is confirmed at step S41, the head unit 1 is first positioned at the home position at step S43 with the ink sucking port 13 communicated with the open air through the three-way valve 19, and the cap 9 is closed.

Then, at step S45, the three-way valve 19 is changed over to communicate the sub-tank 15 with the ink sucking port 14, and at step S47, the pump 5 is manually or automatically driven to start the suction. At a point of time whereat for example, one second has passed (Step S49) after the start of this pumping, the three-way valve 19 is changed over and at step S51, the ink sucking port 13 has been communicated with the open air. Thereafter, for exanple, for four seconds, the sucking operation of the pump 5 has·been continued (Step S53). This is done to avoid the leakage of ink into the interior of the apparatus which may occur when the cap 9 is opened if the interior of the cap 9 is filled with the sucked ink or the occurrence of the unsatisfactory recording which may be caused by the vicinity of the discharge port 14 being wet with the ink. That is, four seconds of the latter half of the pumping has been allotted to the suction of the air from the ink sucking port 13 and the sucking operation for emptying the cap 9 of its ink has been performed.

After the termination of the pumping, the cap 9 is opened at step S57, and at step S59, test print is effected, and when a good print condition is judged, return is made to Step S33 and the standby state is again entered, and when it is judged that the unsatisfactory discharge state is not eliminated (the discharge is not restored), return is made to step S43, where the discharge restoring operation is performed again.

According to the two embodiments described above, design is made such that the suction by the pump in the restoring operation is not only effected from the discharge port, but also effected from the suction tube communicating with the ink tank, through the cap, and therefore, even when the ink in the discharge port portion has increased in viscosity or adhered to the vicinity of the discharge port, such ink could be washed away by the ink sucked from the ink sucking port. Accordingly, a very effective restoring operation is possible, and even when the apparatus has been left unused for a long period of time, the reliability of the apparatus is improved and the selection of the recording ink has become possible over a wide range.

In the foregoing, description is made of an ink jet recording apparatus using a suction pump as the restoring means, but even in a case where use is made of restoring means for forcing the ink out of the discharge port by a pump pressurizing the ink liquid path and thereby restoring the discharge, the portion corresponding to the ink sucking port 13 provided in the cap is utilized as an ink outlet port communicating with the pressurizing pump to cause the ink to flow out through said outlet port and fill the interior of the cap, whereby the viscosity-increased or adhering ink in the discharge port portion can be washed away by the flowing-out ink. Also, the foregoing two embodiments have been described with respect to a case where the present invention is applied to an ink jet recording apparatus which effects discharge by a piezo-electric element which is an electro-mechanical converting member as a discharge energy generating member, but of course, the present invention can also be very effectively and readily applied to an ink jet recording apparatus using other discharge energy generating member, for example, an electro-thermal converting member (such as a heat generating resistance element or the like).

As described above, according to the present invention, unsatisfactory discharge resulting from an increase in viscosity or an adherence of the ink in the discharge port portion can be easily and reliably eliminated by a relatively simple construction and thus, even after the apparatus is left unused for a long period of time, the reliability of the apparatus is not harmed and moreover, the selection of the recording ink can be done over a wide range.

What is claimed is:

1. An ink jet recording apparatus comprising:

a recording head section having a discharge port for discharging ink therethrough;

a storing section for storing ink to be supplied through a supply path to said recording head section;

a cap for covering said discharge port;

pump means in communication with said cap at a first location;

a communication path having first and second ends, said first end being connected to said cap at a second location different from the first location and said second end being connected to said storing section; and a valve provided in said communication path.

2. An ink jet recording apparatus according to claim 1, wherein said valve connects and disconnects communication through said communication path.

3. An ink jet recording apparatus according to claim 1, wherein said valve is a three-way valve for communicating said communication path leading from said cap and said communication path leading from said storing section with the atmosphere.

4. An ink jet recording apparatus according to claim 1, wherein said valve communicates said communication path leading from said cap with either of said communication path leading from said storing section or with the atmosphere.

5. An ink jet recording apparatus according to claim 1, wherein said valve is associated in operation with the operation of said cap and pump means.

6. An ink jet recording apparatus comprising:

an ink jet recording head section having a discharge port for discharging ink therethrough;

a storing section for storing ink to be supplied through a supply path to said ink jet recording head section;

a cap contacting said ink jet recording head for covering said discharge port;

contacting means for contacting said ink jet recording head with said cap;

a communication path leading from a first location on said cap and connecting said cap with said storing section;

pump means for generating a suction force communicating with said cap at a second location different from the first location;

a valve provided in said communication path; and control means for controlling said contacting means, said pump means and said valve.

7. An ink jet recording apparatus according to claim 6, wherein said valve connects or disconnects said communication path.

8. An ink jet recording apparatus according to claim 6, wherein said valve comprises a three-way valve for communicating said communication path leading from said cap and said communication path leading from said storing portion with the atmosphere.

9. An ink jet recording apparatus according to claim 6, wherein said valve communicates said communication path leading from said cap with either of said communication path leading from said storing section or with the atmosphere.

10. An ink jet recording apparatus according to claim 6, wherein said valve is associated in operation with the operation of said contacting means and said pump means.

11. An ink jet recording apparatus according to claim 6, wherein said contacting means is cap moving means.

12. An ink jet recording apparatus according to claim 6, wherein the contacting of said cap and said head is performed outside of the recording area.

13. A method for recovering discharge in a liquid jet recording head, the method comprising:

capping a discharge port of the ink jet recording head with a cap;

driving a pump to create a suction force in the cap after the capping step, with ink and/or gas being sucked by the suction force from the discharge port and/or a storing section for storing ink to be supplied to the ink jet recording head through a communication path between the cap and the storing section, with the communication path having a valve;

communicating the interior of the cap with the atmosphere; and releasing the capping after termination of the driving of the pump.

14. A method according to claim 13, wherein the valve is open when the capping is performed.

15. A method for recovering discharge in a liquid jet recording head, the method comprising:

capping a discharge port of an ink jet recording head with a cap, the capping being performed when a valve communicates the cap with open air, and the valve being in a connecting path communicating the cap with a storing portion storing the ink supplied to the recording head;

operating the valve so as to communicate the cap with the storing portion after the capping step;

driving a pump to create a suction force in the cap after the valve is operated; and releasing the cap after the driving of the pump is stopped.

16. A method according to claim 15, wherein the cap and the open air are communicated by operating the valve before the driving of the pump is stopped.

17. A method according to claim 16, wherein the time duration of the driving after the operation of the valve is longer than the time of the driving before the operation of the valve.

18. An apparatus according to claim 1, wherein said recording head is integrally formed with said storing section.

19. An apparatus according to claim 6, wherein said ink jet recording head is integrally formed with said storing section.

20. An ink jet recording apparatus comprising:

an ink jet recording head section having a discharge port for discharging ink therethrough;

a first storing section for storing ink;

a second storing section communicating with said ink jet recording head section for storing ink to be supplied thereto;

a supply tube for communicating said first storing section with said second storing section;

a cap for covering said discharge port;

a suction tube communicating an interior portion of said cap with said second storing section;

vent means provided on said suction tube for communicating said interior portion of said cap with atmospheric air through said suction tube; and suction means in communication with said cap for creating a suction force in said cap, wherein communication between said interior portion of said cap and the atmospheric air is disconnected by said vent means and ink is sucked through said cap from either of said second storing section and said discharge port in response to driving of said suction means.

21. An apparatus according to claim 20, wherein said ink jet recording head is integrally formed with said first storing section.

* * * * *

UNITED STATES PATENT AND TRADEMARK OFFICE
CERTIFICATE OF CORRECTION

PATENT NO. : 4,847,637
DATED : July 11, 1989
INVENTOR(S) : KENJIRO WATANABE ET AL.

It is certified that error appears in the above-identified patent and that said Letters Patent is hereby corrected as shown below:

COLUMN 1

Line 32, "fixativenees" should read --fixativeness--.
Line 36, "coped" should read --dealt--.
Line 52, "storing portion" should read --a storing portion--.
Line 55, "communicating" should read --communicating with--.
Line 62, "such in" should read --suck in--.
Line 66, "stopped;" should read --stopped,--.

COLUMN 2

Line 11, "operated;" should read --operated,--.
Line 39, "viscosity" should read --a viscosity--.

COLUMN 3

Line 23, "has been" should read --is--.
Line 56, "controlled" should read --controls--.

COLUMN 4

Line 4, "has" should read --is--.
Line 5, "been" should be deleted.
Line 9, "has been" should read --is--.
Line 11, "has been" should read --is--.
Line 15, "left" should be deleted and "opened." should read --left opened.--.
Line 26, "by visually made" should read --visually--.
Line 33, "has been" should read --is--.
Line 49, "adhereing" should read --adhering--.
Line 55, "has been" should read --is--.

UNITED STATES PATENT AND TRADEMARK OFFICE

CERTIFICATE OF CORRECTION

PATENT NO. : 4,847,637

DATED : July 11, 1989

INVENTOR(S) : KENJIRO WATANABE ET AL.

It is certified that error appears in the above-identified patent and that said Letters Patent is hereby corrected as shown below:

COLUMN 5

Line 31, "is shift" should read --the shift--.
Line 52, "has been" should read --is--.
Line 54, "has been" should read --is--.

COLUMN 6

Line 18, "has" should read --is--.
Line 19, "become" should be deleted.

Signed and Sealed this

Fifteenth Day of May, 1990

*Attest:*

HARRY F. MANBECK, JR.

*Attesting Officer*

*Commissioner of Patents and Trademarks*